United States Patent [19]

Lim

[11] Patent Number: 5,004,890
[45] Date of Patent: Apr. 2, 1991

[54] METHOD OF EVALUATING QUALITY OF A LASER BEAM IN A LASER PROCESSING MACHINE

[75] Inventor: Gnian C. Lim, Auburn Hills, Mich.
[73] Assignee: Amada Company, Limited, Japan
[21] Appl. No.: 481,514
[22] Filed: Feb. 20, 1990
[51] Int. Cl.⁵ ............................................. B23K 26/00
[52] U.S. Cl. .......................... 219/121.83; 219/121.62; 219/121.74; 219/121.84
[58] Field of Search ...................... 219/121.61, 121.62, 219/121.78, 121.74, 121.79, 121.83, 121.84

[56] References Cited

U.S. PATENT DOCUMENTS

| | | | |
|---|---|---|---|
| 4,555,610 | 11/1985 | Polad et al. | 219/121.61 |
| 4,866,243 | 9/1989 | Sakane et al. | 219/121.62 |
| 4,937,422 | 6/1990 | Nagamine et al. | 219/121.62 X |
| 4,939,336 | 7/1960 | Meyer et al. | 219/121.62 |

*Primary Examiner*—C. L. Albritton
*Attorney, Agent, or Firm*—Wigman & Cohen

[57] ABSTRACT

A method of evaluating quality of a laser beam output of an X-Y-Z movement laser processing head of beam generator by detecting an instantaneous profile of the beam by means of dynamical laser beam analyzer, calculating values of beam stability parameter of the beam profiles, each value of the beam stability parameter corresponding to one of the laser beam profiles, comparing the beam profiles detected and adjusting mirror orientation in the generator and calculating a standard deviation of the stability parameters and adjusting condition in supplying a laser gas to the generator.

7 Claims, 8 Drawing Sheets to amplifier

METHOD OF EVALUATING QUALITY OF A LASER BEAM IN A LASER PROCESSING MACHINE

BACKGROUND OF THE INVENTION

1. Field of the Invention

The present invention relates to a method of evaluating quality of a laser beam in a laser processing machine, and in particular to a method of evaluating quality of a laser beam output from a laser processing head of a laser processing machine.

2. Description of the Prior Art

In certain laser processing of materials, it is found that the quality of the laser beam is an important factor in producing high quality products. In particular, when using high-power $CO_2$ lasers for cutting relatively thin sheets of steels, peak-to-peak roughness of the cut kerf may vary from less than a micro-meter to well over ten micro-meters, depending upon the quality of the laser beam being used.

Thus, it is important to accurately and quantitatively evaluate the quality of the laser beam.

Based upon result of the evaluation of the quality of the laser beam, accurately performed are adjustments of various lasing conditions in a laser generator of a laser processing machine, such as alignment of mirrors provided in the generator and condition in supplying of laser gas thereto and the like.

Conventionally, the laser beam quality such as laser beam profile is detected by burning holes in such material as metal foils, or acrylic plastic or card.

However, such method which measure the location of a single isotherm in the material being treated is inaccurate since the location of the isotherm depends upon unrelated variable such as laser power, exposure time, material thickness, surface reflectivity, and the like.

Thus, in order to accurately and quantitatively measure the laser beam quality such as laser beam profile, the present inventor has disclosed, in "Optics and Laser Technology", vol 14 (June 1982) pp. 149-153, a dynamical laser beam analyzer 10 as shown in FIG. 1.

In FIG. 1, a rod 11 is attached to the surface of a circular plate 13 with one end thereof pointing toward the center of the plate 13 and the other end protruding from the edge of the plate 13.

The rod 11 and the plate 13 is rotated by a synchronous motor 15. The synchronous motor 15 is positioned so that when it is operated, the rod 11 is rotated to cross perpendicularly laser beam L focussed by a focussing lens 17.

The laser beam L reflected by the rod 11 is detected, with a high resolution and a high response speed, by a detector 19 placed in a position where the plane containing the laser beam L and the detector 19 is at right angle to the rotation plane of the plate 13. Specifically, the detector 19 is provided with a pyroelectric crystal 19a for converting the optical energy into the electric energy and a loading resistor (not shown) connected to the pyroelectric crystal 19a.

Incidentally, behind the rod 11, a beam sink 21 is provided for absorbing beam energy of the laser beam L transmitted forward, passing by the rod 11.

With the above analyzer, a cross sectional profile of the laser beam L is output from the detector 19 as voltage signal varying in time. Specifically, an output trace shown in FIG. 2 which shows a intensity profile of the laser beam L is obtained with a high resolution and a high response speed.

SUMMARY OF THE INVENTION

It is the first object of the present invention to provide a method of evaluating quality of a laser beam in a laser processing machine, which method enable quick and accurate evaluation of the quality of the laser beam. The laser processing machine to which this invention is applied comprises a frame, and a laser processing head supported on the frame free to move in the X-, Y-, and Z-axis directions and free to rotate about a vertical axis and a horizontal axis.

To achieve the above-mentioned first object, the first method of present invention comprises the steps of: (a) mounting a dynamical laser beam analyzer on the frame of the laser processing machine; (b) moving the laser processing head in the X-, Y-, and/or Z-axis directions so that the head is positioned in front of the dynamical laser beam analyzer; (c) rotating the laser processing head about the vertical axis and/or the horizontal axis so that a tip section is directed to a beam entrance section of the dynamical laser beam analyzer; (d) detecting an instantaneous profile of a laser beam by means of the dynamical laser beam analyzer; (e) repeating the detection of the step (d); (f) calculating values of a beam stability parameter of the laser beam profiles, each value of the beam stability parameter corresponding to one of the laser beam profiles; and (g) calculating a standard deviation of the beam stability parameters from the values of the beam stability parameter calculated in the step (f).

It is the second object of the present invention to provide a method of accurately adjusting orientations of mirrors in a laser generator provided in a laser processing machine, based upon the evaluation of the laser beam quality accomplished in the above.

To achieve the second object, the second method of the present invention, comprises the steps of: detecting an instantaneous profile of a laser beam by means of a dynamical laser beam analyzer; repeating the detection of the laser beam profile; comparing the detected beam profiles with each other; and suitably adjusting orientations of mirrors in the laser generator when the shapes of the beam profiles considerably vary from profile to profile.

The third object of the present invention is to provide a method of quickly and easily adjusting laser gas supply condition in a laser generator which is provided in a laser processing machine.

To achieve the above-mentioned third object, the third method of the present invention comprises: detecting an instantaneous profile of a laser beam by means of a dynamical laser beam analyzer; repeating the detection of the laser beam profile; calculating values of a beam stability parameter of the beam profiles, each value of the beam stability parameters corresponding to one of the beam profiles; calculating standard deviation of the beam stability parameters from the calculated values thereof; adjusting condition in supplying of a laser gas to a laser generator when the standard deviation considerably decreases as average beam power increases.

The fourth object of the present invention is to provide a method of quickly and accurately calculating a gaussian width of the laser beam in a laser processing machine.

To achieve the above-mentioned fourth object, the forth method of the present invention comprises steps of: detecting an instantaneous profile of a laser beam by means of a dynamical laser beam analyzer; repeating the detection of the laser beam profile; calculating instantaneous beam widths of the detected instantaneous beam profiles, each beam width corresponding to one of the beam profiles, and each instantaneous beam width being defined as the size of the instantaneous beam profile which contains [1-exp(-2)] of the total beam energy; calculating average beam width of the laser beam from the calculated instantaneous beam widths; and calculating a gaussian beam width from the average beam width by multiplying a prescribed width ratio.

BRIEF DESCRIPTION OF THE DRAWINGS

The features and advantages of the methods in accordance with the present invention will be more clearly appreciated from the following description taken in conjunction with the accompanying drawings in which like reference numerals designate the same or similar elements or sections throughout the figures thereof and in which.

DETAILED DESCRIPTION OF THE PREFERRED EMBODIMENTS

Figure 3:
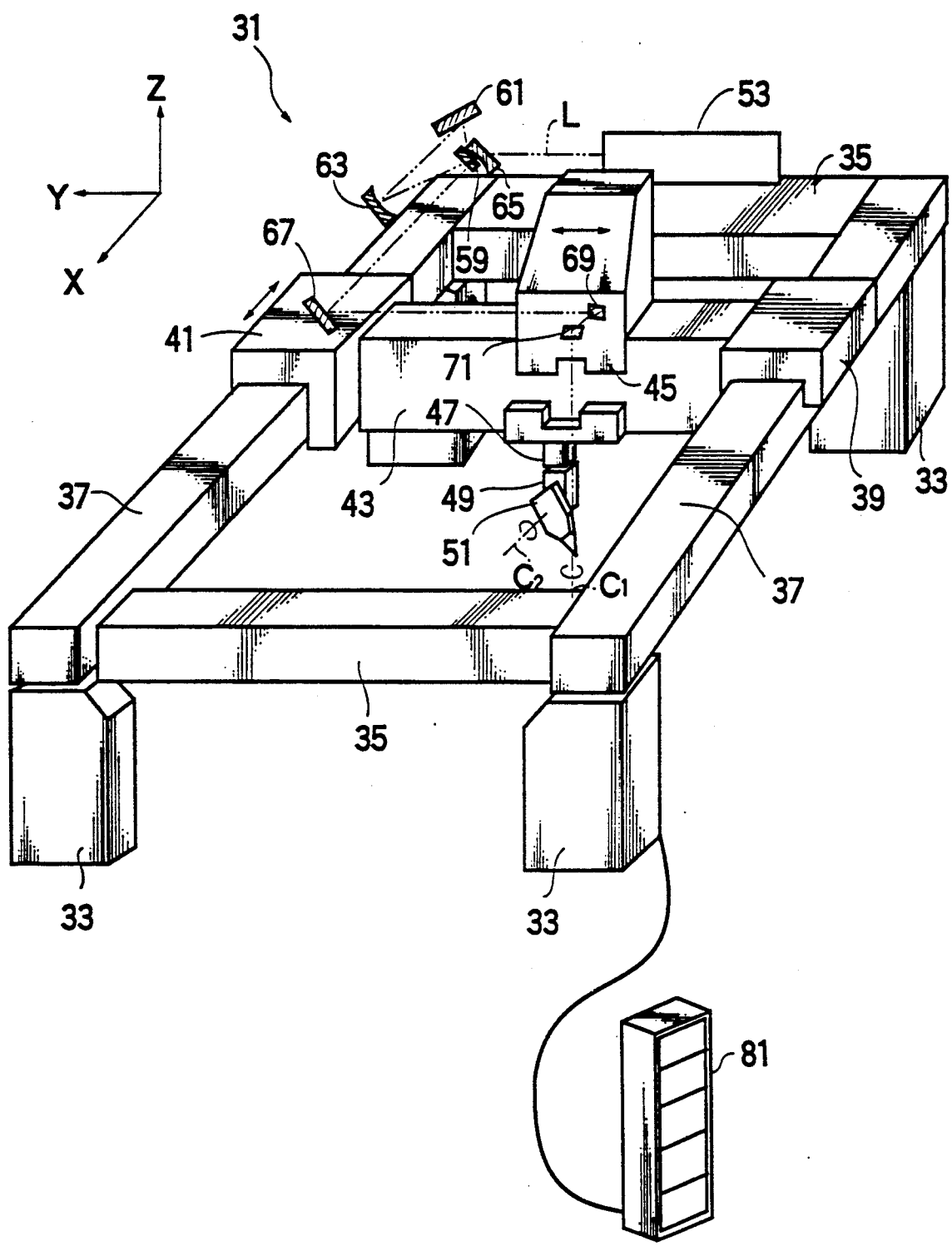
FIG. 3 is a perspective view showing a laser processing machine to which the methods of the present invention is applied.

With reference to FIG. 3, a laser processing machine to which an embodiment of the present invention is applied will be first described.

To start off, as shown in FIG. 3, the laser processing machine 31 comprises four columns 33 that support two support members 35 and two X-axis guide sleeves 37. Slidably supported by the X-axis guide sleeves 37 are X-axis carriage shoulders 39 and 41, between which is connected integrally an X-axis carriage 43 extending in Y-axis direction. The X-axis carriage 43 in turn supports a Y-axis carriage 45 which is slidably mounted upon the X-axis carriage 43. Extending from the bottom of the Y-axis carriage is a height-adjustable Z-axis column 47.

On the Z-axis column 47, a rotatable element 49 is mounted so as to be rotatable about a vertical axis $C_1$, and on the element 49 a laser processing head 51 is mounted so as to be rotatable about horizontal axis $C_2$.

Accordingly, in the laser processing machine 31, the laser processing head 51 can be moved in three dimensional directions by moving the X-axis carriage 43 n X-axis direction, the Y-axis carriage 45 in Y-axis direction and the Z-axis column 47 in Z-axis direction. Further, by rotating the element 49 about the vertical axis $C_1$ and by rotating the laser processing head 51 about the horizontal axis $C_2$, the tip of the laser cutting head 51 can be directed in any directions in the three dimensional directions.

In particular, the laser processing head 51 is moved to a rear most, left most, and upper most position in FIG. 4 (it will be hereinafter called a home position of the laser processing head) and a tip section thereof is directed to the X-axis direction for laser beam from the processing head 51 to be detected with the dynamical laser beam analyzer, as will be explained later in detail.

In order to generate a laser beam for processing, a laser generator 53 is provided on the rear-side of the support member 35. The laser beam L output from the laser generator is reflected by mirrors 59, 61, 63, 65, 67, 69, and 71 to reach the laser processing head 51.

Figure 4:
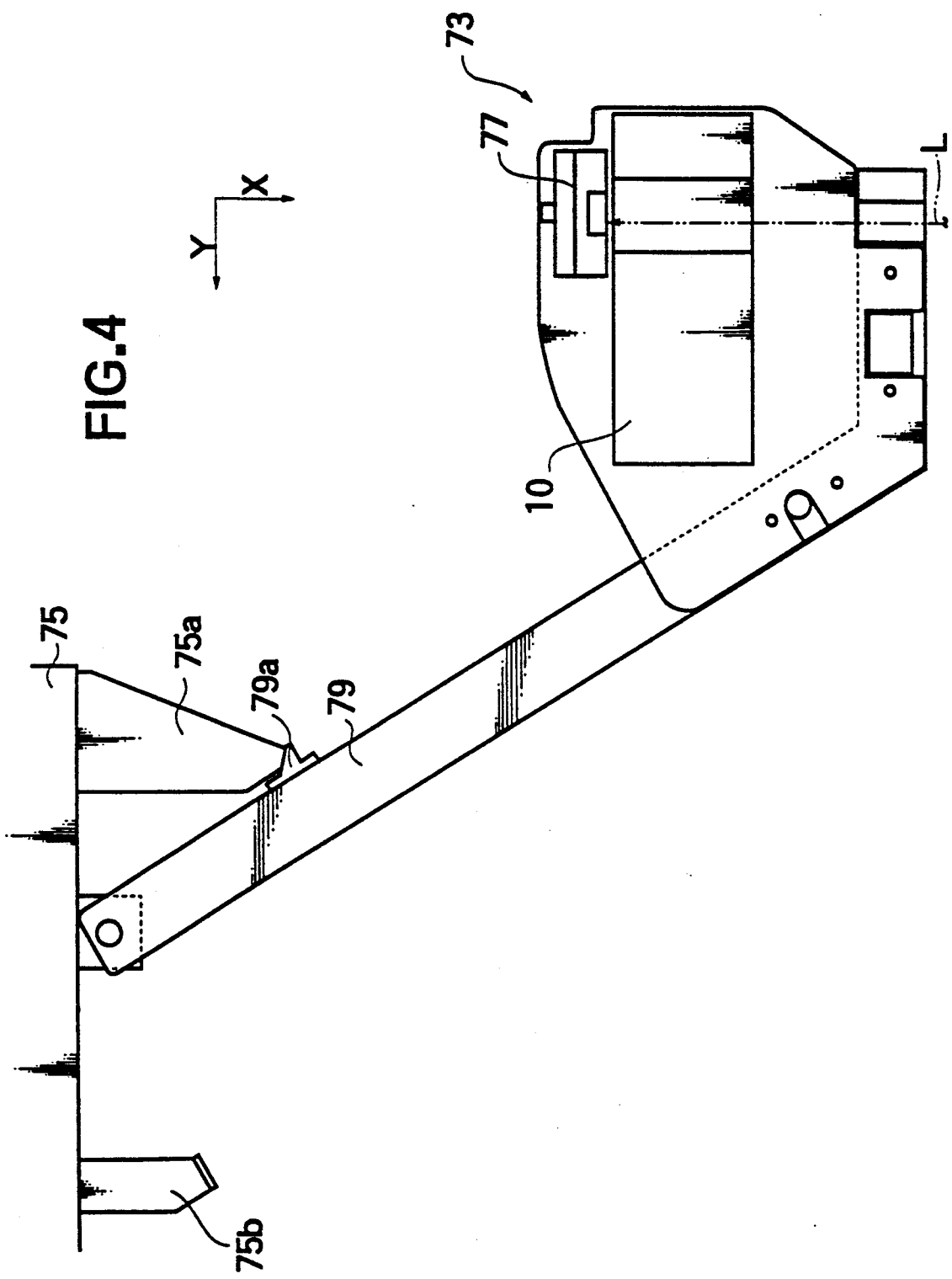
FIG. 4 is a plane view of the dynamical laser beam analyzer mounted on the laser processing machine for carrying out an embodiment of the present invention.

Referring to FIG. 4, a laser beam detecting device 73 is provided on a vertical section 75 of the frame 32, 35 or 37, which section is located at the rear most, left most, and upper most side of the frame 33, 35 or 37 in FIG. 3.

Specifically, on the vertical section 75, a horizontal lever 79 is supported free to rotate in the horizontal plane, and supported on the free end of the horizontal lever 79 is the dynamical laser beam analyzer 10 and a power meter 77 as the laser beam detecting device 73.

The laser beam detection device 73 is arranged on the frame section 75 in a manner such that when the horizontal lever 79 is rotated counterclockwise (in FIG. 4) for its mid section 79a to abut a protrusion section 75a of the frame section 75, the detection device 73 is moved to the detection position corresponding to the rear most, left most, and upper most position of the laser processing head 51. In the detection position, the center axis of a beam entrance section of the laser beam detection device 73 is accurately aligned with the X-axis.

A protrusion section 75b is provided for defining a rest position thereof, at which position the detection means 73 does not obstruct the movement of the laser processing head 51.

In the above arrangement, the laser beam L from the laser processing head 51 is detected by the laser beam detecting device 73 in the following manner:

In the first place, the X-axis carriage 43 is moved to a rear most position, the Y-axis carriage 15 to a left most position in FIG. 3, the Z-axis column 47 to an upper most position so that the laser processing head 51 is positioned at the rear most, left most, and upper most position thereof (i.e. home position of the head 51).

Then, the element 10 and the head 21 is respectively rotated about the vertical axis $C_1$ and the horizontal axis $C_2$ so that the tip section of the head 21 is directed to the input opening of the laser beam detection device 73.

In this method, the laser beam L output from the laser processing head 51 is detected quickly and easily. Hence, its beam quality is also evaluated quickly and easily.

Figure 1:
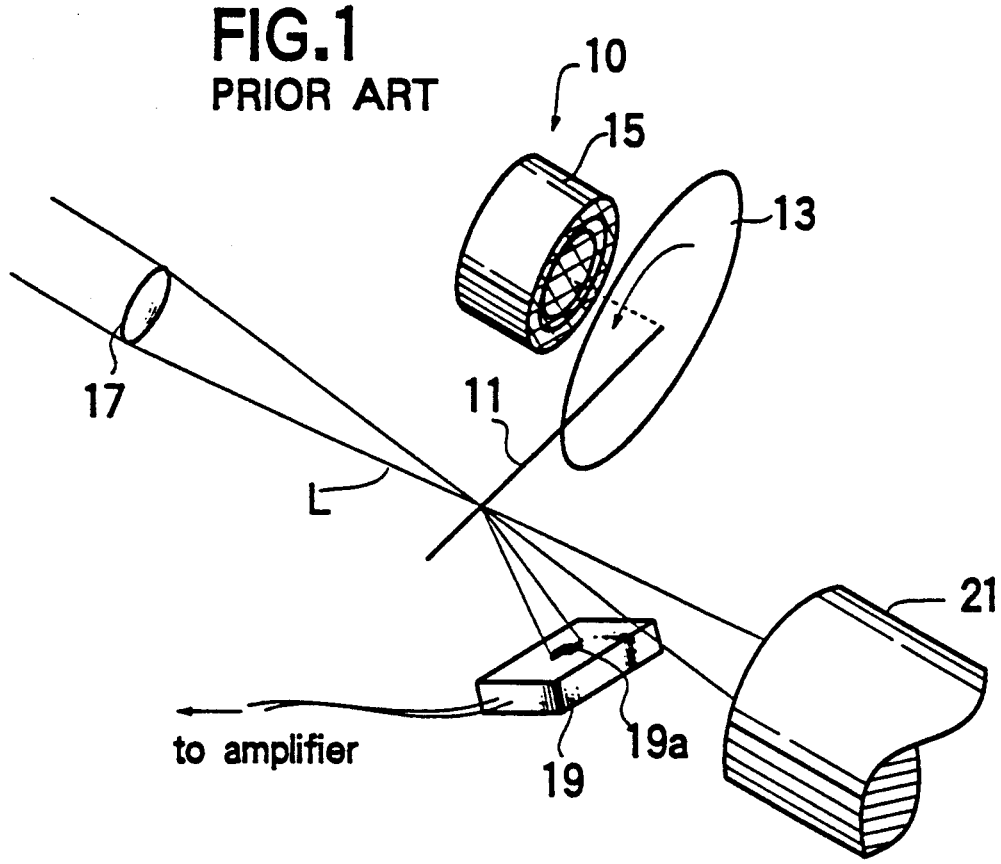
FIG. 1 schematically illustrates an arrangement of the prior art of the dynamical laser beam analyzer.
Figure 5:
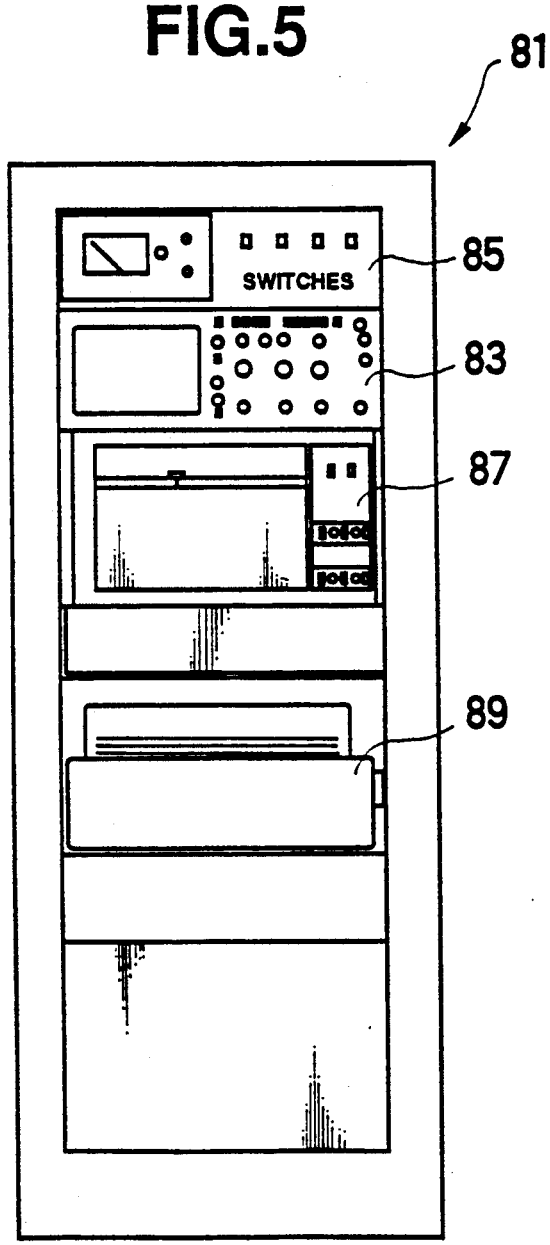
FIG. 5 is a front view of a data processing device for carrying out an embodiment of the present invention.

Referring now to FIG. 1 and FIG. 5, connected to the laser processing machine 31a is a data processing device 81 for processing data from the laser beam detecting device 73.

Specifically, the data processing device 81 comprises a 2.5 mega-hertz sampling rate and 12-bit resolution analog-to-digital converter 83, in which a random access memory (RAM) is available.

An external trigger line is also available on the converter 83, which line can be tied to the trigger line from the dynamic laser beam analyzer 10. This trigger point represents a reference position of the beam trace detected by the analyzer 10. High speed consecutive traces can therefore be acquired and stored temporarily in the high speed RAM before being transferred to the disk storage system of a computer (not shown) connected to the laser processing machine 31.

As shown in FIG. 5, the data processing device 81 is further provided with a power meter/switches 85 for assisting the operation of the converter 83, and a chart recorder 87 and a printer 89 for outputting processed data.

Now, with reference to FIGS. 6–13, the method of analyzing the data from the dynamical laser beam analyzer 10 will be explained.

In FIG. 6 to 11, six examples of the beam profiles output from five different lasers are shown. In each figure, six (out of a total of 110) example traces representing instantaneous laser beam profiles are illustrated. Upper and lower two-dot chain lines drawn in each of these figures indicate the upper and lower limits within which all the 110 traces fall. Power of laser generators employed are from 500 W to 1.5 KW.

Figure 6:
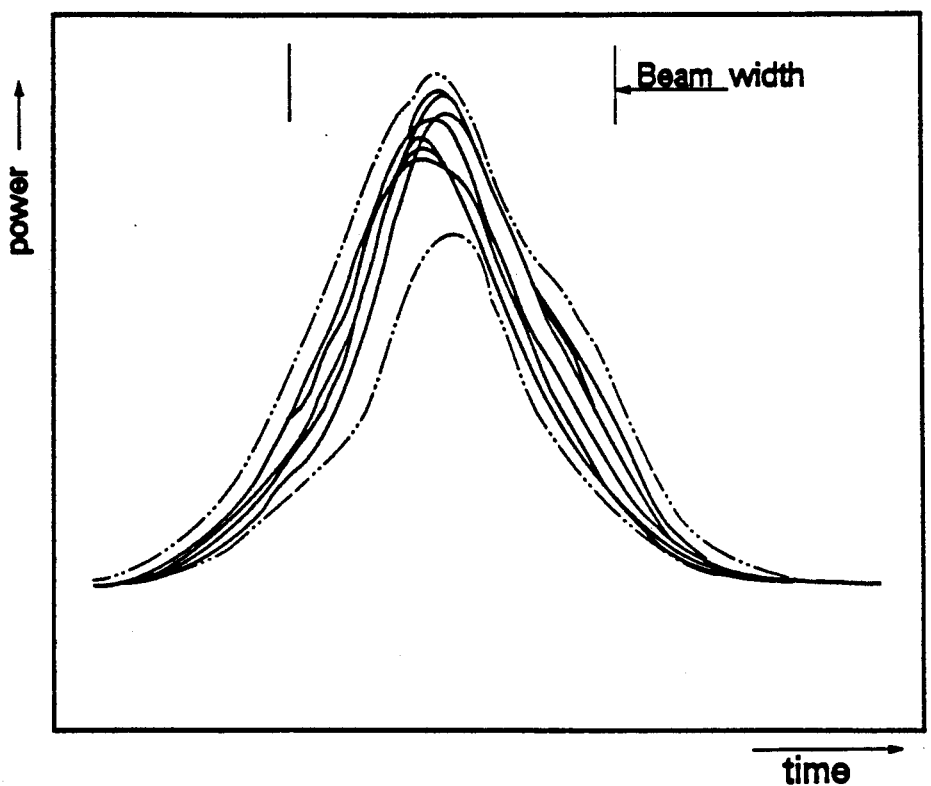
FIGS. 6 to 11 are diagrams illustrating output from the dynamical laser beam analyzers, each output corresponding to a laser beam from one of different laser generators mounted on the laser processing machine.
Figure 7:
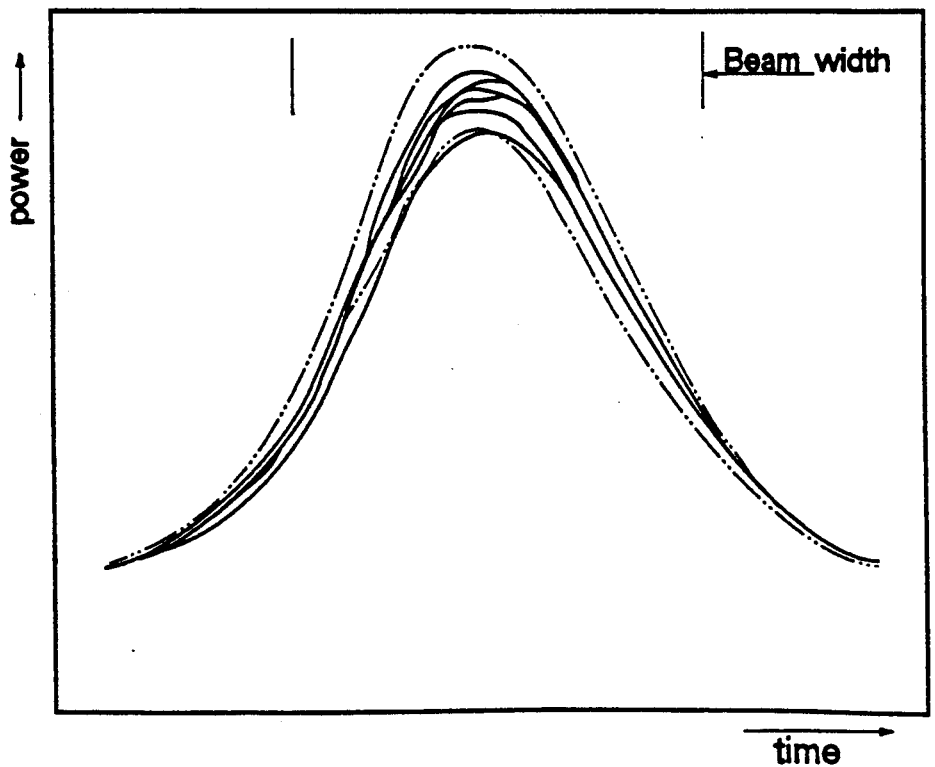
Figure 8:
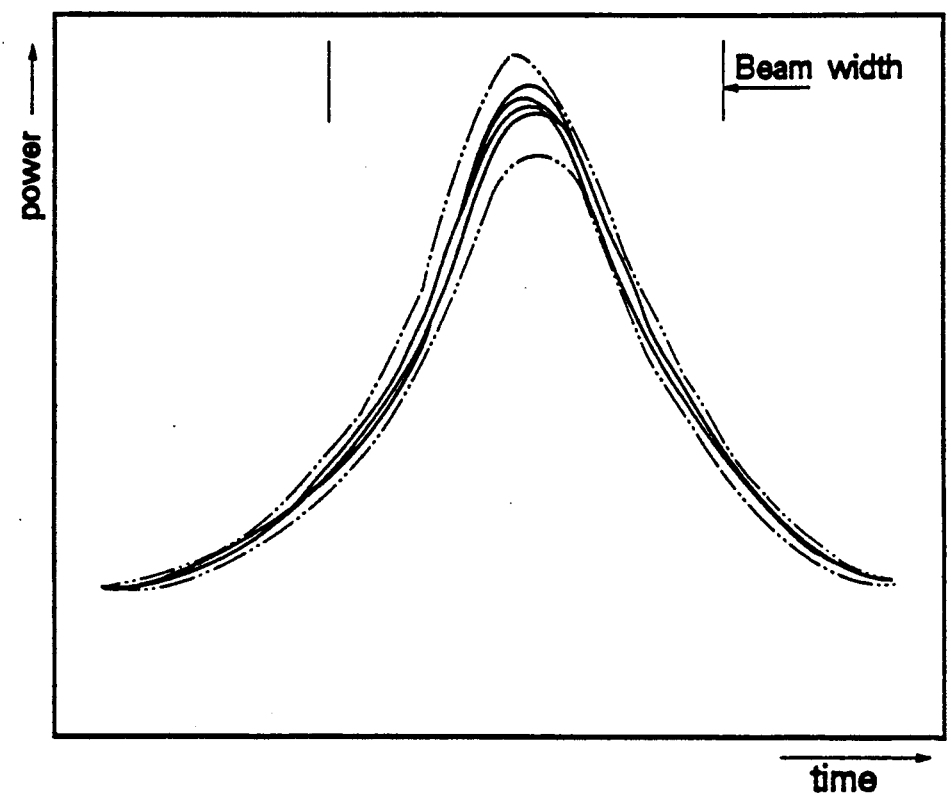

FIG. 6 shows traces from a fast axial flow laser, the 1350 watt FH1350 manufactured by PRC. FIG. 7 shows traces from another fast axial flow laser, the SP810 which is rated at 500 watts from Spectra Physics. FIG. 8 shows traces from a transverse flow laser, the 1500 watt SP820, also from Spectra Physics. All these lasers give near TEMoo modes.

Figure 9:
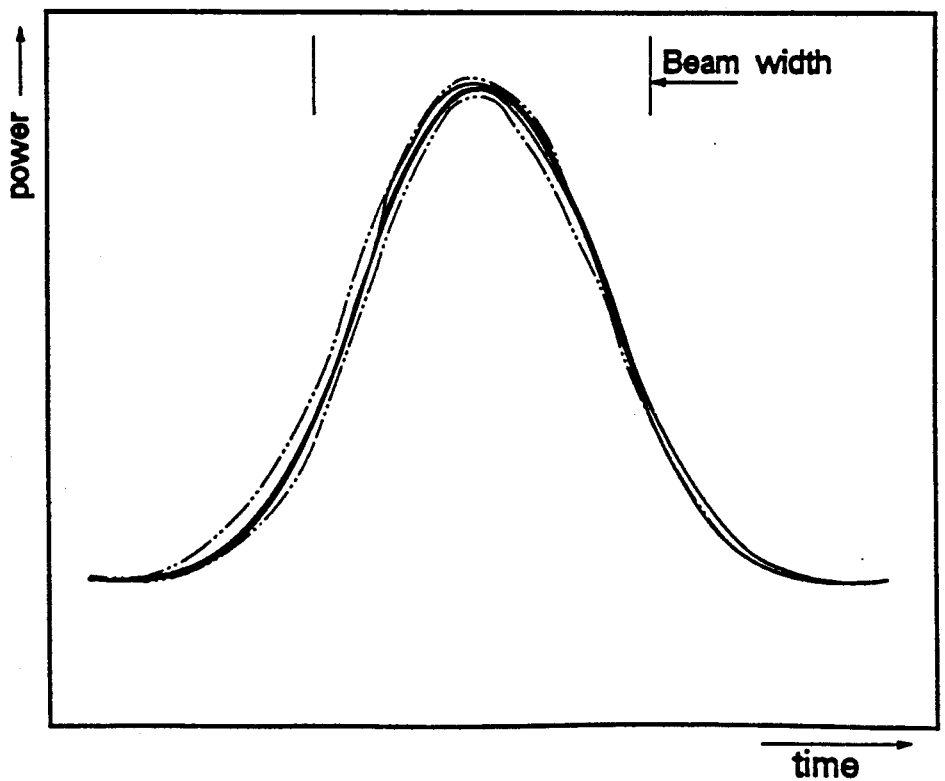

FIG. 9 are traces from even another fast axial flow laser code named LABX, which is 500 watt laboratory experimental laser. It has been fine tuned in order to produce the best beam quality.

From the above, it is understood that when the laser is fined turned, fluctuations in the traces (laser beam profiles) detected by the dynamical laser beam analyzer 10 are small, and on the other hand when it is roughly turned, the fluctuations in the traces arc large.

Thus, whether the laser generator is fined tune or not is clearly detected by measuring magnitude of the fluctuation of the traces detected by the dynamical laser beam analyzer 10.

Figure 10:
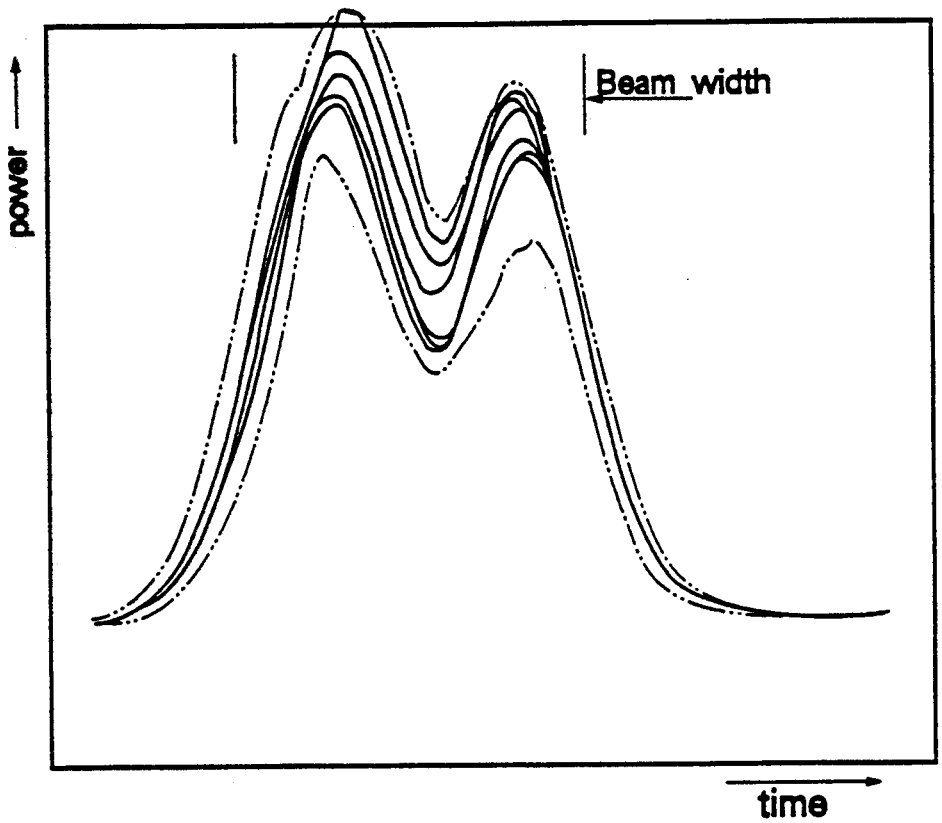
Figure 11:
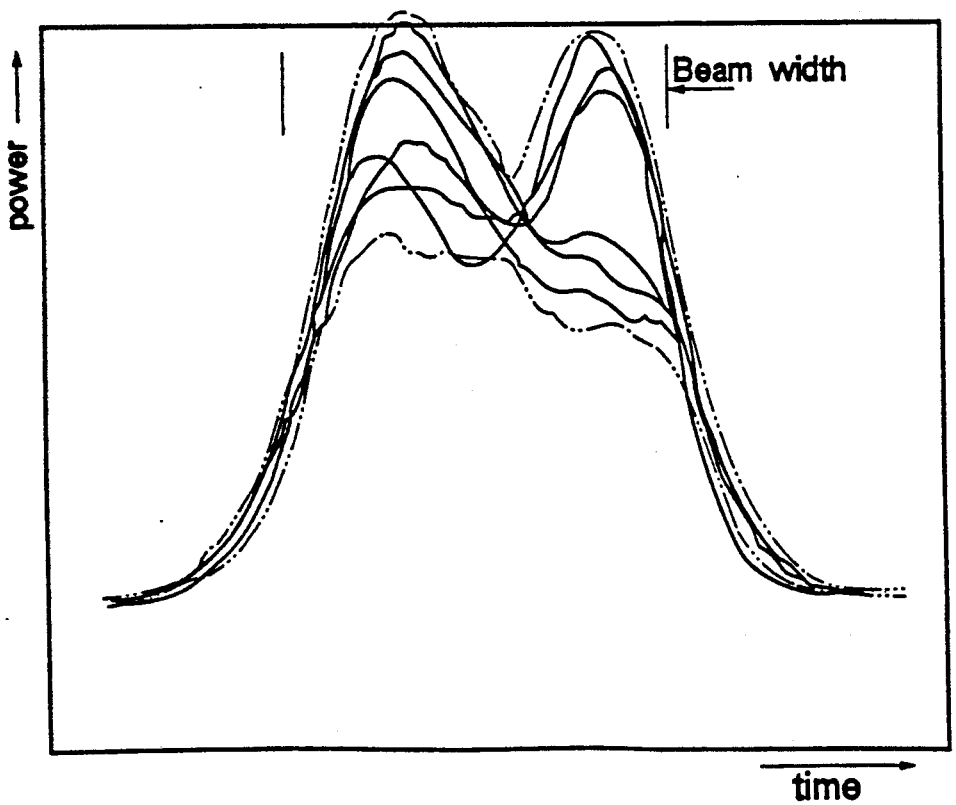

This is more clearly understood by observing FIGS. 10 and 11.

FIGS. 10 and 11 are both from the fast axial flow laser the EFA-51 manufactured by coherent, and rated at 1500 watts. The difference between these two is that the resonator of the laser generator outputting the traces of FIG. 11 is slightly mis-aligned. That is to say, in the laser generator outputting the traces of FIG. 11, highly unstable mode laser beams are generated, and the profile of the laser beam badly fluctuates in time, since a laser resonator is mis-aligned.

Thus, influence to mode stability of cavity optics alignment is clearly detected by the dynamical laser beam analyzer.

In other words, by detecting fluctuations in the traces (beam profiles) by means of the dynamical laser beam analyzer, the alignment of the optical resonator in the laser generator is checked. When a large fluctuation is observed, the optical resonator is readily re-adjusted.

It should be noted that the conventionally acquired beam profiles for the two modes shown in FIGS. 10 and 11, which is taken by bearing pieces of acrylic blocks, are basically similar 'dough-nut' mode profiles and the abovementioned mis-alignment in the resonator can not be detected.

In order to quantitatively evaluate quality of laser beams represented by the beam profiles shown in FIGS. 6–11, instantaneous beam parameters will be introduced; those parameters that have more practical influence in laser cutting are: (a) beam power, (b) beam width, (c) beam center, (d) half width energy difference, (e) half energy position, (f) peak power position, and (g) peak power value In dealing with randomly fluctuating samples quantitatively, one first calculate a mean value, which is the same as that obtained when measuring with a slow response instrument. This value alone does not provide any information on how the parameter varies from one sample to another. Hence, another statistical number, termed the standard deviation, is also calculated. This number shows how far and how often each sample in the set deviates from its mean value. Further, in order to compare these parameters between different lasers, the percentage of fluctuation calculated by dividing the standard deviation by its average value are used.

Definition of the above-mentioned parameters will be given, with the result of the measured lasers summarized in Table 1 to 6.

(a) Beam Power

It is noted that accurate measurement of the beam power can be obtained only if the complete two dimensional profile is sampled. Since the dynamical laser beam analyzer outputs only the power profiles along the Y or Z orthogonal axes (in FIG. 3), the beam power is calculated by summing the area under one of the output signal against a base line (zero power line). This of course does not provide correct value of the beam power. However, since the concern of this invention, is with the stability of the laser beam, the beam power thus calculated does provide a good representation of its power fluctuation property.

The standard deviation of the instantaneous beam power are given in Table 1 to 6. The absolute value for the power obtained from the dynamical laser beam analyzer's data are not given because the output signals are in voltage whose value are proportional to not only beam intensity but also to the gain setting of the amplifier for the dynamical laser beam analyzer 10. Instead, the average beam powers which are measured with the power meter are shown.

(b) Beam Width

The beam width of each profile is defined as the size of the beam which contains $[1-\exp(-2)]$ of the total beam energy. It is obtained as follows, First, the total area under the trace which corresponds to the total instantaneous beam energy is calculated (as the beam power). Then, the left hand edge of the beam width is found by summing the area under the profile from the extreme left hand side of the profile until the position where its area occupies half of $\exp(-2)$ of the total area. The right hand edge of the beam is similarly found by summing the area from the extreme right hand side of the profile. The beam width is the distance between these two edges.

(c) Beam Width Center Position

This is defined as the mid-point between the left hand and the right hand edges of the beam width as obtained in the beam width calculation above. There is actually no absolute value for the mean center position since the frame of reference can be anywhere in the laboratory. Hence, only the standard deviation and its percentage which is obtained by dividing the standard deviation by its beam width are given in the tables.

(d) Half Width Energy Difference

This is obtained by finding the difference in energy (area under the curve) between the left hand half and the right hand half of the beam center, and then dividing this difference by the total energy (total area under the curve). It shows how symmetrical the beam energy is distributed about the beam center, and has a value of zero for a perfectly symmetrical beam.

(e) Energy Center Position

This is defined as the position where the beam profile is divided into two equal halves of energy. The percentage is obtained by dividing the deviation by its beam width. This parameter may be considered as a measure of the position stability of the laser beam.

(f) Peak Power Position

This is defined as the position where the power density reaches maximum value. For a single peak beam profile it has a well defined location. But, for a multiple peak profile it is possible that the maximum power might occur at different peaks for different samples. If this happens, the position would jump from one peak to another even though the actual power level might only vary slightly between the peaks. In such cases, values of first peak, second peak, etc. are calculated. Each peak is defined as maxima with at least a 5percent decrease in value at either side of the maxima. This means that a small kink in the profile will not be treated as a peak. The percentage is obtained by dividing the deviation by its beam width.

(g) Power Values

This is defined as the power density of the beam profile where the peaks occur, as defined in the peak power positions above. As with the beam power, the absolute peak power values are not given; only the percentages obtained by dividing the standard deviation by its mean value are presented.

With reference to the tables 1-6 it is understood that the values of all the stability parameters generally increase as the beam power (the average power) is increased.

The most notable exception are those of the SP820 when it is operated at very low power level and at recommended pressure. What happens in that situation is that the low electrical discharge current result in only a partial occupancy of the cathode area by the plasma, a phenomena attributed to the fact that electrical plasma occupies just enough cathode area so as to maintain a constant current per unit area. As there is much more cathode area in the SP820 than necessary when operated at low power level, the plasma move about, though generally staying in the center region of the cathode length, causing the appearance of both plasma and laser beam power instability.

Another exception is those of the SP810. Again the plasma looks flickering at very low power. Being of entirely different electrode configuration from that of the SP820, the cause of this is also different. In this case, the power supply is not able to maintain a constant low discharge current, due to loss of current regulation as a result of not enough high voltage provided for the tetrodes and discharge tubes, or improper adjustment of the current control amplifier.

With both these two lasers, the situation is improved by lowering the operating pressure (during low power operation) which will reduce the current per unit are and hence spreading out the plasma along the cathode. Alternatively, the Helium content of the laser gas may be increased so that the discharge current needs to be increased in order to produce the same level of low laser power.

To summarize, the quality of the laser beam output from the laser processing head in the laser beam processing machine is improved by the method of adjuster laser generator comprising the steps of: (a) mounting a dynamical laser beam analyzer on the frame of the laser processing machine; (b) moving the laser processing head in the X-, Y-, and/or Z-axis directions so that the head is positioned in front of the dynamical laser beam analyzer; (c) rotating the laser processing head about the vertical axis and/or the horizontal axis so that a tip section of the laser processing head is directed to a beam entrance section of the dynamical laser beam analyzer (d) detecting an instantaneous profile of a laser beam by means of a dynamical laser beam analyzer (e) repeating the detection of the step (d); (f) calculating values of a beam stability parameter of the beam profiles each value of the beam stability parameters corresponding to one of the beam profiles; (g) calculating standard deviation of the beam stability parameters from the values of the beam stability parameter calculated in the step (f); (h) adjusting condition in supplying of a laser gas to a laser generator when the standard deviation considerably decreases as average beam power increases.

In order to perform accurate laser processing by means of the laser processing machine disclosed above, it is important to accurately measure the Gaussian width W, which is defined by W in the following formula for a power density for a TEMoo mode:

$$P(r) = Po \times \exp[-2r^2/(W)^2] \quad (1)$$

where Po is the power density of the peak of the profile, W is the Gaussian beam width, and r is the distance from the beam center. Po is related to the total power Pt by the formula, $P = 2 \times Pt/\pi \times (W)^2$.

As the equations imply, the beam profile is completely defined if the total power, Pt, and the Gaussian radius, W, are known. The Gaussian radius is defined as the radius of a TEMoo beam where the power density has fallen to $\exp(-2)$ of the peak value Po. The center portion of the beam covered by a radius equal to its Gaussian radius also contains $(1 - \exp(-2))$ of the total beam energy for a TEMoo beam.

These two parameters can be extracted from the output profile from the dynamical laser beam analyzer. However, proper interpretation must be exercised. As discussed in the previous section the output from the dynamical laser beam analyzers represents the power density profile along a diameter of beam cross-section. The total area under this output trace, as evaluated in the instantaneous power analysis as explained above, is not exactly equal to the total beam energy. To obtain the correct total energy for a beam which is circularly symmetrical about its center, it is necessary to multiply its intensity at r by $2\pi r$ and then integrate it from $R = 0$ to infinity. The value of the beam width at $(1 - \exp(-2))$ of the total energy should be calculated in a similarly way for a TEMoo mode. However, in the beam parameter calculations in the above, the factor $2\pi r$ was ignored. This means that the beam width obtained when compared with its Gaussian width differs therefrom by a certain factor, which is referred to hereinafter as the beam width ratio. ThIs factor is given by the formula, $$(\text{Width ratio}) = (\text{Gaussian width, } 2w)/(\text{Beam width}) \quad (2)$$

This ratio can be obtained from the calculation of the beam width of a theoretical Gaussian beam by integrating its area while ignoring the $2\pi r$ factor, just as was done in the instantaneous beam width calculation, and then comparing its value with the Gaussian width, $2w$. For a TEMoo beam, it turns out that the Gaussian beam width is 1.33 times the calculated beam width.

Figure 2:
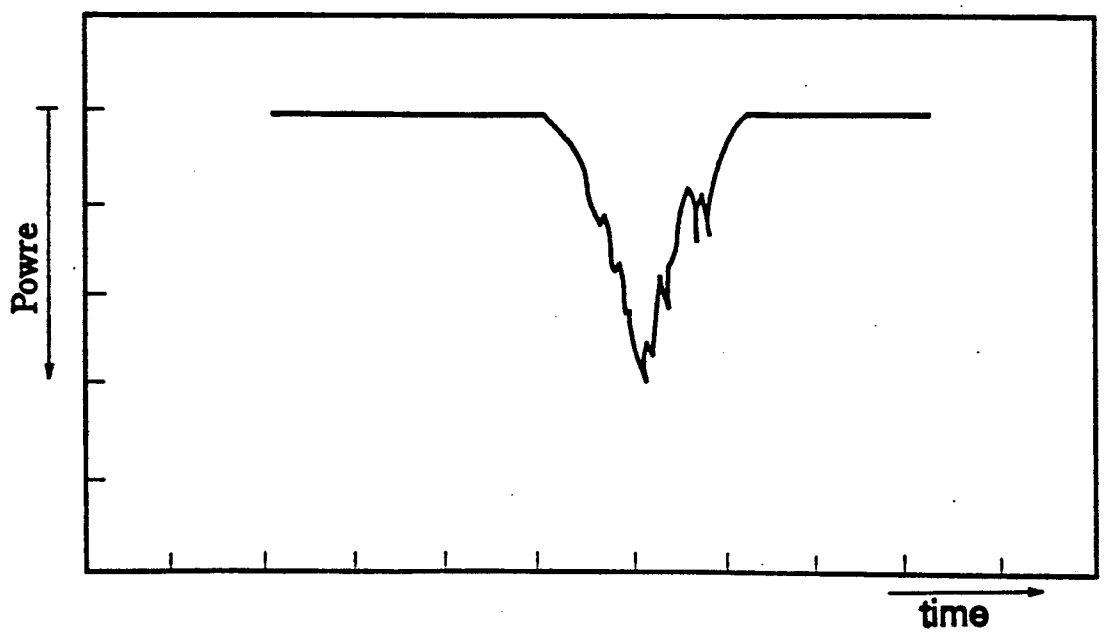
FIG. 2 is a diagram illustrating an output voltage from the dynamical laser beam analyzer.
Figure 12:
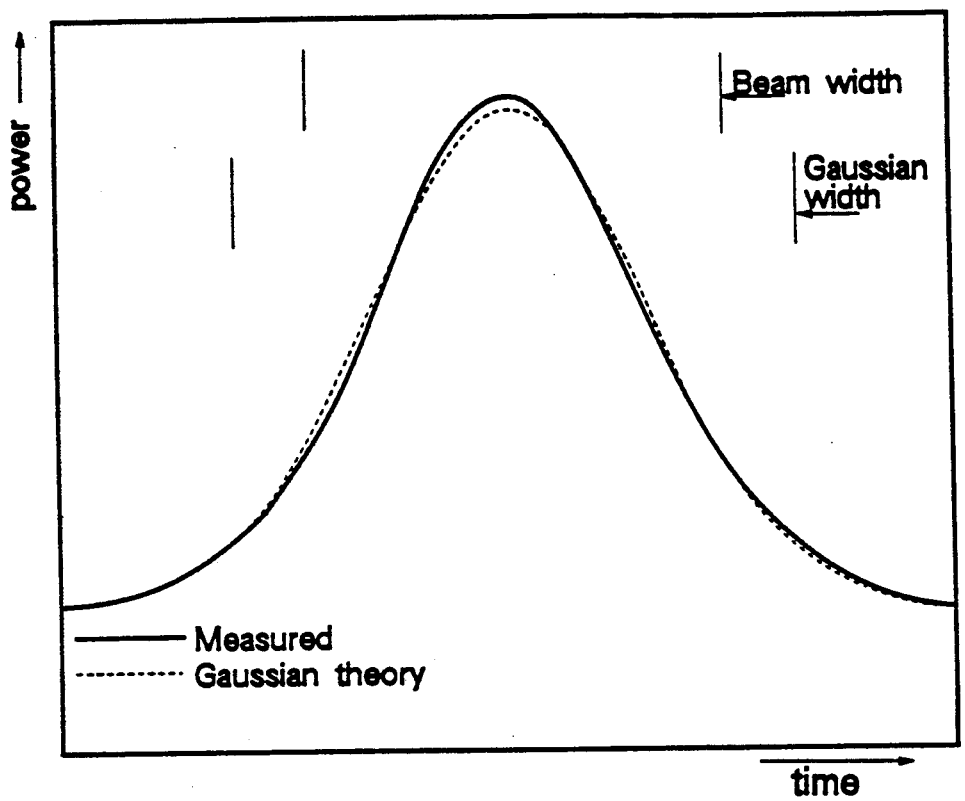
FIGS. 12 and 13 illustrate gaussian laser beam profiles fitted with two of the detected beam profiles.
Figure 13:
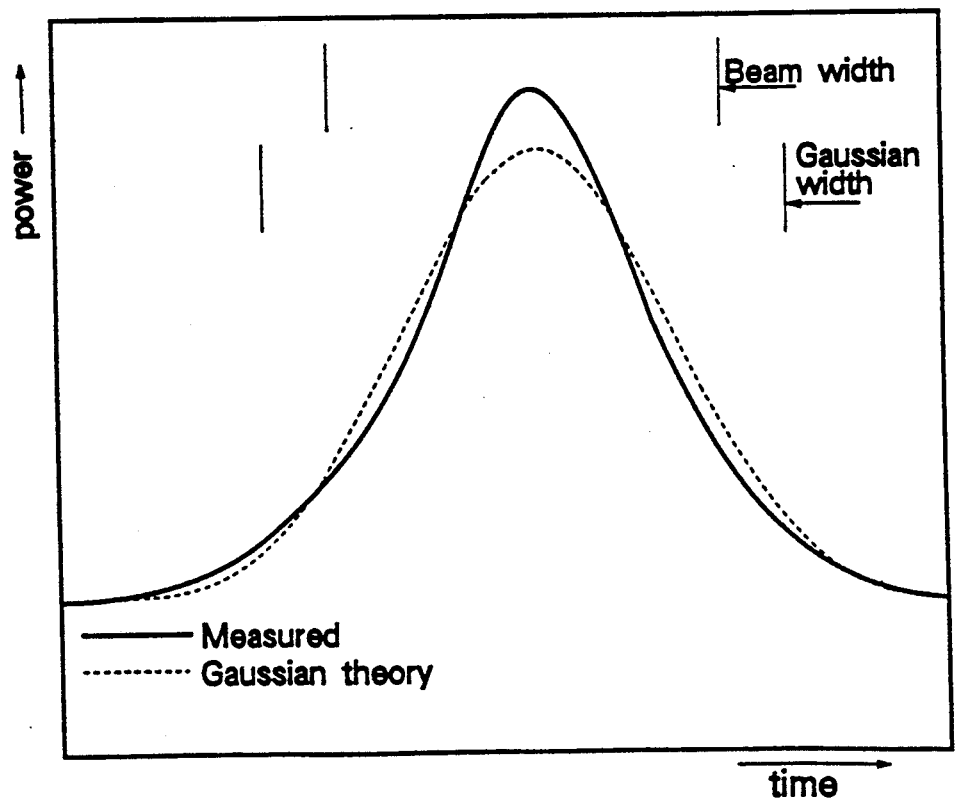

With reference to FIGS. 12 and 13, comparisons of actual laser beams with theoretical Gaussian beams have been made on the averaged beam profiles of the outputs from the dynamical laser beam analyzer. The measured beam profiles in FIGS. 12 and 13 correspond respectively to the profiles shown in FIGS. 2 and 3, for which it is assumed that they are of TEMoo mode. Hence their respective Gaussian beam widths are obtained by multiplying the calculated beam widths by 1.33 for use in the formula (1). The peak power, Po, is properly scaled so that the area under the theoretical Gaussian curve is the same as the laser beam analyzer output trace. It can be seen that reasonably good fits are obtained for these lasers.

Thus, the Gaussian width of a laser beam output from the laser processing head in the laser processing machine is accurately calculated by the method comprising step of: (a) mounting a dynamical laser beam analyzer on the frame of the laser processing machine; (b) moving the laser processing head in the X-, Y-, and/or Z-axis directions so that the head is positioned in front of the dynamical laser beam analyzer; (c) rotating the laser processing head about the vertical axis and/or the horizontal axis so that a tip section of the laser processing head is directed to a beam entrance section of the dynamical laser beam analyzer; (d) detecting an instantaneous profile of a laser beam by means of a dynamical laser beam analyzer; (e) repeating the detection of the step (d); (f) calculating instantaneous beam widths of the instantaneous beam profiles which are detected at the steps (d) and (e), each beam width corresponding to one of the beam profiles, and each instantaneous beam width being defined as the size of the instantaneous beam profile which contains $[1-\exp(-2)]$ of the total beam energy; (g) calculating average beam width of the laser beam from the calculated instantaneous beam widths; and (h) calculating a gaussian beam width from the average beam width by multiplying a prescribed width ratio.

Once the Gaussian width of the laser beam is accurately measured, readily calculated is, for example, a offset value for offsetting a trace of a laser beam center with respect to a desired cutting line on a workpiece so as to perform an accurate laser beam cutting.

Although the invention has been described in its preferred embodiments, it is to be understood that various changes and modifications may be made within the purview of the appended claims without departing from the true scope and spirit of the invention in its broader aspects.

TABLE 1

| | | Coherent EFA 51 | | | |
|---|---|---|---|---|---|
| Average power | | 200 W | 700 W | 1000 W | 1500 W |
| Percentage of rated | | 13% | 47% | 67% | 100% |
| BEAM POWER | | | | | |
| Std. deviation Percentage: | (%) | 1.35 | 1.17 | 2.14 | 3.84 |
| BEAM WIDTH | | | | | |
| Average: | (mm) | 15.83 | 14.82 | 14.03 | 13.00 |

TABLE 1-continued

| | | Coherent EFA 51 | | | |
|---|---|---|---|---|---|
| Average power | | 200 W | 700 W | 1000 W | 1500 W |
| Percentage of rated | | 13% | 47% | 67% | 100% |
| Std. deviation: | (mm) | 0.085 | 0.090 | 0.163 | 0.319 |
| Percentage: | (%) | 0.542 | 0.612 | 1.163 | 2.46 |
| BEAM CENTER | | | | | |
| Std. deviation. | (mm) | 0.041 | 0.056 | 0.097 | 0.185 |
| Percentage: | (%) | 0.261 | 0.381 | 0.696 | 1.42 |
| HALF WIDTH ENERGY DIFF. | | | | | |
| Average: | (%) | 0.995 | 2.67 | 3.33 | 5.09 |
| Std. deviation: | (%) | 0.451 | 0.439 | 0.82 | 1.73 |
| HALF ENERGY POSITION | | | | | |
| Std. deviation: | (mm) | 0.063 | 0.072 | 0.114 | 0.267 |
| Percentage: | (%) | 0.403 | 0.489 | 0.82 | 2.06 |
| PEAK POWER POSITION | | | | | |
| Std. deviation: | (mm) | 0.196 | 0.251 | 0.291 | 1.198 |
| Percentage: | (%) | 1.24 | 1.70 | 2.08 | 9.22 |
| PEAK POWER VALUE | | | | | |
| Std. deviation: Percentage: | (%) | 1.63 | 1.87 | 3.20 | 4.95 |

TABLE 2

| | | Coherent EFA 51 | | | |
|---|---|---|---|---|---|
| Average power | | 200 W | 700 W | 1000 W | 1500 W |
| Percentage of rated | | 13% | 47% | 67% | 100% |
| BEAM POWER | | | | | |
| Std. deviation Percentage: | (%) | 2.46 | 3.03 | 3.98 | 3.93 |
| BEAM WIDTH | | | | | |
| Average: | (mm) | 9.81 | 11.42 | 10.40 | 9.701 |
| Std. deviation: | (mm) | 0.083 | 0.138 | 0.140 | 0.115 |
| Percentage: | (%) | 0.849 | 1.209 | 1.348 | 1.188 |
| BEAM CENTER | | | | | |
| Std. deviation. | (mm) | 0.038 | 0.179 | 0.132 | 0.095 |
| Percentage: | (%) | 0.389 | 1.569 | 1.271 | 0.984 |
| HALF WIDTH ENERGY DIFF. | | | | | |
| Average: | (%) | 1.90 | 3.86 | 5.93 | −2.96 |
| Std. deviation: | (%) | 0.73 | 8.39 | 9.49 | 1.81 |
| HALF ENERGY POSITION | | | | | |
| Std. deviation: | (mm) | 0.041 | 0.387 | 0.421 | 0.121 |
| Percentage: | (%) | 0.425 | 3.39 | 4.06 | 1.25 |
| PEAK POWER POSITION | | | | | |
| Std. deviation: | (mm) | 0.172 | 3.13 | 2.44 | 0.561 |
| Percentage: | (%) | 1.76 | 27.37 | 23.43 | 5.78 |
| PEAK POWER VALUE | | | | | |
| Std. deviation: Percentage: | (%) | 2.98 | 7.19 | 5.77 | 4.80 |

TABLE 3

| | | PRC FH 1350 | | | |
|---|---|---|---|---|---|
| Average power | | 210 W | 700 W | 1000 W | 1350 W |
| Percentage of rated | | 16% | 52% | 74% | 100% |
| BEAM POWER | | | | | |
| Std. deviation Percentage: | (%) | 2.58 | 2.74 | 4.12 | 4.93 |
| BEAM WIDTH | | | | | |
| Average: | (mm) | 7.39 | 8.05 | 7.59 | 7.26 |
| Std. deviation: | (mm) | 0.074 | 0.139 | 0.162 | 0.174 |
| Percentage: | (%) | 1.01 | 1.73 | 2.14 | 2.40 |
| BEAM CENTER | | | | | |
| Std. deviation. | (mm) | 0.078 | 0.101 | 0.171 | 0.239 |
| Percentage: | (%) | 1.07 | 1.26 | 2.27 | 3.31 |
| HALF WIDTH ENERGY DIFF. | | | | | |
| Average: | (%) | 1.63 | −1.10 | −0.043 | 1.06 |
| Std. deviation: | (%) | 0.906 | 1.97 | 2.34 | 2.58 |
| HALF ENERGY POSITION | | | | | |
| Std. deviation: | (mm) | 0.078 | 0.125 | 0.203 | 0.265 |
| Percentage: | (%) | 1.06 | 1.56 | 2.68 | 3.66 |
| PEAK POWER POSITION | | | | | |
| Std. deviation: | (mm) | 0.154 | 0.198 | 0.174 | 0.191 |
| Percentage: | (%) | 2.09 | 2.47 | 2.30 | 2.63 |

TABLE 3-continued

| | PRC FH 1350 | | | |
|---|---|---|---|---|
| Average power | 210 W | 700 W | 1000 W | 1350 W |
| Percentage of rated | 16% | 52% | 74% | 100% |
| PEAK POWER VALUE | | | | |
| Std. deviation: | | | | |
| Percentage: (%) | 3.32 | 4.12 | 5.18 | 4.92 |

TABLE 4

| | Spectra Physics SP 810 | | | |
|---|---|---|---|---|
| Average power | 100 W | 200 W | 4000 W | 600 W |
| Percentage of rated | 20% | 40% | 80% | 120% |
| BEAM POWER | | | | |
| Std. deviation Percentage: (%) | 13.25 | 3.71 | 3.89 | 6.83 |
| BEAM WIDTH | | | | |
| Average: (mm) | 8.86 | 9.05 | 9.19 | 8.20 |
| Std. deviation: (mm) | 0.288 | 0.125 | 0.136 | 0.345 |
| Percentage: (%) | 3.25 | 1.39 | 1.49 | 4.21 |
| BEAM CENTER | | | | |
| Std. deviation. (mm) | 0.221 | 0.068 | 0.010 | 0.194 |
| Percentage: (%) | 2.50 | 0.75 | 1.05 | 2.38 |
| HALF WIDTH ENERGY DIFF. | | | | |
| Average: (%) | 3.00 | 3.18 | 2.74 | −9.10 |
| Std. deviation: (%) | 2.82 | 1.30 | 1.14 | 4.12 |
| HALF ENERGY POSITION | | | | |
| Std. deviation: (mm) | 0.285 | 0.075 | 0.104 | 0.191 |
| Percentage: (%) | 3.22 | 0.83 | 1.14 | 2.33 |
| PEAK POWER POSITION | | | | |
| Std. deviation: (mm) | 0.474 | 0.264 | 0.226 | 0.376 |
| Percentage: (%) | 5.36 | 2.92 | 2.46 | 4.59 |
| PEAK POWER VALUE | | | | |
| Std. deviation: | | | | |
| Percentage: (%) | 14.17 | 4.53 | 4.11 | 9.05 |

TABLE 5

| | Spectra Physics SP 820 | | | |
|---|---|---|---|---|
| Average power | 200 W | 700 W | 1000 W | 1350 W |
| Percentage of rated | 13% | 47% | 67% | 90% |
| BEAM POWER | | | | |
| Std. deviation Percentage: (%) | 7.13 | 1.62 | 1.86 | 2.50 |
| BEAM WIDTH | | | | |
| Average: (mm) | 12.20 | 11.52 | 10.89 | 10.71 |
| Std. deviation: (mm) | 0.087 | 0.097 | 0.104 | 0.093 |
| Percentage: (%) | 0.715 | 0.845 | 0.955 | 0.869 |
| BEAM CENTER | | | | |
| Std. deviation. (mm) | 0.089 | 0.096 | 0.109 | 0.119 |
| Percentage: (%) | 0.736 | 0.837 | 1.009 | 1.112 |
| HALF WIDTH ENERGY DIFF. | | | | |
| Average: (%) | 7.61 | 5.75 | 5.33 | −4.82 |
| Std. deviation: (%) | 0.684 | 0.868 | 0.908 | 1.27 |
| HALF ENERGY POSITION | | | | |
| Std. deviation: (mm) | 0.083 | 0.089 | 0.112 | 0.134 |
| Percentage: (%) | 0.688 | 0.780 | 1.030 | 1.256 |
| PEAK POWER POSITION | | | | |
| Std. deviation: (mm) | 0.166 | 0.169 | 0.121 | 0.174 |
| Percentage: (%) | 1.364 | 1.472 | 1.117 | 1.633 |
| PEAK POWER VALUE | | | | |
| Std. deviation: | | | | |
| Percentage: (%) | 6.80 | 1.86 | 2.01 | 3.52 |

TABLE 6

| | LABX | | | |
|---|---|---|---|---|
| Average power | 200 W | 400 W | 500 W | 600 W |
| Percentage of rated | 40% | 80% | 100% | 120% |
| BEAM POWER | | | | |
| Std. deviation Percentage: (%) | 1.18 | 1.16 | 1.32 | 1.83 |
| BEAM WIDTH | | | | |

TABLE 6-continued

| | LABX | | | |
|---|---|---|---|---|
| Average power | 200 W | 400 W | 500 W | 600 W |
| Percentage of rated | 40% | 80% | 100% | 120% |
| Average: (mm) | 8.18 | 7.67 | 7.42 | 7.22 |
| Std. deviation: (mm) | 0.100 | 0.084 | 0.095 | 0.115 |
| Percentage: (%) | 1.23 | 1.10 | 1.29 | 1.60 |
| BEAM CENTER | | | | |
| Std. deviation. (mm) | 0.054 | 0.069 | 0.092 | 0.103 |
| Percentage: (%) | 0.671 | 0.904 | 1.244 | 1.433 |
| HALF WIDTH ENERGY DIFF. | | | | |
| Average: (%) | 0.357 | 0.787 | −0.818 | −1.489 |
| Std. deviation: (%) | 0.970 | 0.647 | 0.686 | 0.811 |
| HALF ENERGY POSITION | | | | |
| Std. deviation: (mm) | 0.044 | 0.062 | 0.080 | 0.093 |
| Percentage: (%) | 0.548 | 0.808 | 1.09 | 1.30 |
| PEAK POWER POSITION | | | | |
| Std. deviation: (mm) | 0.178 | 0.127 | 0.138 | 0.127 |
| Percentage: (%) | 2.18 | 1.66 | 1.87 | 1.77 |
| PEAK POWER VALUE | | | | |
| Std. deviation: | | | | |
| Percentage: (%) | 1.992 | 0.871 | 0.809 | 1.043 |

What is claimed is:

1. A method of evaluating quality of a laser beam in a laser processing machine which comprises a frame, and the laser processing head supported on the frame free to move in the X-, Y-, and Z-axis directions and free to rotate about a vertical axis and a horizontal axis, the method comprising the steps of:

(a) mounting a dynamical laser beam analyzer on the frame of the laser processing machine;

(b) moving the laser processing head in the X-, Y-, and/or Z-axis directions so that the head is positioned in front of the dynamical laser beam analyzer;

(c) rotating the laser processing head about the vertical axis and/or the horizontal axis so that a tip section is directed to a beam entrance section of the dynamical laser beam analyzer;

(d) detecting an instantaneous profile of a laser beam by means of the dynamical laser beam analyzer;

(e) repeating the detection of the step (d);

(f) calculating values of a beam stability parameter of the laser beam profiles, each value of the beam stability parameter corresponding to one of the laser beam profiles;

(g) calculating a standard deviation of the beam stability parameters from the values of the beam stability parameter calculated in the step (f).

2. A method of adjusting orientations of mirrors in a laser generator which is provided in a laser processing machine which comprises a frame, and a laser processing head supported on the frame free to move in the X-, Y-, and Z-axis directions and free to rotate about a vertical axis and a horizontal axis, the method comprising the steps of:

(a) mounting a dynamical laser beam analyzer on, the (b) moving the laser processing head in the X-, Y-, and/or Z-axis directions so that the head is positioned in front of the dynamical laser beam analyzer;

(c) rotating the laser processing head about the vertical axis and/or the horizontal axis so that a tip section of the laser processing head is directed to a beam entrance section of the dynamical laser beam analyzer;

(d) detecting an instantaneous profile of a laser beam by means of a dynamical laser beam analyzer;

(e) repeating the detection of the step (d);
(f) comparing the beam profiles detected in the steps (d) and (c), with each other; and
(g) suitably adjusting orientations of mirrors in the laser generator when the shapes of the beam profiles considerably vary from profile to profile.

3. A method of adjusting condition in supplying of a laser gas with a laser generator which is provided on a laser processing machine which comprises a frame, and a laser processing head supported on the frame free to move in the X-, Y-, and Z-axis directions and free to rotate about a vertical axis and a horizontal axis, the method comprising steps of:
  (a) mounting a dynamical laser beam analyzer on the frame of the laser processing machine;
  (b) moving the laser processing head in the X-, Y-, and/or Z-axis directions so that the head is positioned in front of the dynamical laser beam analyzer;
  (c) rotating the laser processing head about the vertical axis and/or the horizontal axis so that a tip section of the laser processing head is directed to a beam entrance section of the dynamical laser beam analyzer;
  (d) detecting an instantaneous profile of a laser beam by means of a dynamical laser beam analyzer;
  (e) repeating the detection of the step (d);
  (f) calculating values of a beam stability parameter of the beam profiles, each value of the beam stability parameters corresponding to one of the beam profiles;
  (g) calculating standard deviation of the beam stability parameters from the values of the beam stability parameter calculated in the step (f);
  (h) adjusting condition in supplying of a laser gas to a laser generator when the standard deviation considerably decreases as average beam power increases.

4. The method of claim 2, wherein the beam stability parameter is instantaneous beam power.

5. The method of claim 3, wherein the step of adjusting the laser gas supply condition comprises a step of lowering operating pressure.

6. The method of claim 3, wherein the step of adjusting the laser gas supply condition comprises a step of increasing a content of the helium in the laser gas.

7. A method of measuring a gaussian width of a laser beam output from a laser generator which is provided in an laser processing machine which comprises a frame, and a laser processing head supported on the frame free to move in the X-, Y-, and Z-axis directions and free to rotate about a vertical axis and a horizontal axis, the method comprising steps of:
  (a) mounting a dynamical laser beam analyzer on the frame of the laser processing machine;
  (b) moving the laser processing head in the X-, Y-, and/or Z-axis directions so that the head is positioned in front of the dynamical laser beam analyzer;
  (c) rotating the laser processing head about the vertical axis and/or the horizontal axis so that a tip section of the laser processing head is to a beam entrance section of the dynamical laser beam analyzer;
  (d) detecting an instantaneous profile of a laser beam by means of a dynamical laser beam analyzer;
  (e) repeating the detection of the step (d);
  (f) calculating instantaneous beam widths of the instantaneous beam profiles which are detected at the steps (d) and (e), each beam width corresponding to one of the beam profiles, and each instantaneous beam width being defined as the size of the instantaneous beam profile which contains $[1-\exp(-2)]$ of the total beam energy;
  (g) calculating average beam width of the laser beam from the calculated instantaneous beam widths; and
  (h) calculating a gaussian beam width from the average beam width by multiplying a prescribed width ratio.

* * * * *

UNITED STATES PATENT AND TRADEMARK OFFICE
CERTIFICATE OF CORRECTION

PATENT NO. : 5,004,890
DATED : April 2, 1991
INVENTOR(S) : Gnian C. Lim

It is certified that error appears in the above-identified patent and that said Letters Patent is hereby corrected as shown below:

Column 4, line 49, "element 10" should be --element 19--.
Column 5, line 37, "traces arc" should be --traces are--.
Column 10, line 37, "8.39" should be --8.93--.

IN THE CLAIMS:

Claim 2, column 12, line 57, "on, the" should be --on the frame of the laser processing machine;--.

Signed and Sealed this

Twenty-second Day of September, 1992

Attest:

DOUGLAS B. COMER

Attesting Officer    Acting Commissioner of Patents and Trademarks